US011077561B2

(12) United States Patent
Gu et al.

(10) Patent No.: US 11,077,561 B2
(45) Date of Patent: Aug. 3, 2021

(54) METHOD AND APPARATUS FOR SELECTING INITIAL POINT FOR INDUSTRIAL ROBOT COMMISSIONING

(71) Applicant: ABB Schweiz AG, Baden (CH)

(72) Inventors: Hao Gu, Shanghai (CN); Cheng Li, Shanghai (CN)

(73) Assignee: ABB Schweiz AG, Baden (CH)

( * ) Notice: Subject to any disclaimer, the term of this patent is extended or adjusted under 35 U.S.C. 154(b) by 169 days.

(21) Appl. No.: 16/525,816

(22) Filed: Jul. 30, 2019

(65) Prior Publication Data

US 2019/0351560 A1 Nov. 21, 2019

Related U.S. Application Data

(63) Continuation of application No. PCT/CN2017/074787, filed on Feb. 24, 2017.

(51) Int. Cl.
*B25J 9/16* (2006.01)
*B25J 13/08* (2006.01)
*B25J 9/10* (2006.01)

(52) U.S. Cl.
CPC .............. *B25J 13/088* (2013.01); *B25J 9/10* (2013.01); *B25J 9/1692* (2013.01)

(58) Field of Classification Search
CPC .......... B25J 9/10; B25J 9/1692; B25J 13/088; G05B 2219/35461; G05B 2219/36168; G05B 2219/39021; G05B 2219/40065; G05B 2219/37021; G05B 2219/37231; G05B 2219/39032; G06F 3/041; G06F 11/2221; Y10S 901/14
See application file for complete search history.

(56) References Cited

U.S. PATENT DOCUMENTS 5,740,328 A * 4/1998 Ravani .................. B25J 9/1692
318/568.16
8,326,460 B2 12/2012 Ban et al.
(Continued)

FOREIGN PATENT DOCUMENTS

CN 102189548 A 9/2011
CN 105722650 A 6/2016
(Continued)

OTHER PUBLICATIONS

State Intellectual Property Office of the P.R. China, International Search Report & Written Opinion in corresponding Application No. PCT/CN2017/074787, dated Dec. 7, 2017, 9 pp.
(Continued)

*Primary Examiner* — Dale Moyer
(74) *Attorney, Agent, or Firm* — Taft Stettinius & Hollister LLP

(57) ABSTRACT

A method and apparatus for selecting an initial point for industrial robot commissioning, the initial point being located above a touchscreen for industrial robot commissioning. The method including: calculating a nominal posture of a work object relative to the industrial robot by a nominal posture calculating module; and selecting an initial point according to the nominal posture by an initial point selecting module. The method and apparatus can automatically select the initial point so as to further increase automation of the commissioning process and reduce workloads.

10 Claims, 4 Drawing Sheets

(56) References Cited

U.S. PATENT DOCUMENTS

| | | | |
|---|---|---|---|
| 10,076,839 B2 | 9/2018 | Touma et al. | |
| 2009/0265035 A1* | 10/2009 | Jenkinson | B25J 19/021 |
| | | | 700/259 |
| 2011/0046782 A1 | 2/2011 | Fixell | |
| 2012/0146956 A1 | 6/2012 | Jenkinson | |
| 2014/0111484 A1* | 4/2014 | Welch | G06F 11/2221 |
| | | | 345/178 |
| 2014/0309775 A1* | 10/2014 | Jenkinson | G01L 25/00 |
| | | | 700/250 |
| 2016/0089792 A1* | 3/2016 | Ojalehto | B25J 15/0441 |
| | | | 73/865.6 |
| 2016/0187876 A1* | 6/2016 | Diperna | H04B 17/21 |
| | | | 702/81 |
| 2016/0288332 A1 | 10/2016 | Motoyoshi et al. | |
| 2016/0320889 A1* | 11/2016 | Jenkinson | B25J 9/02 |
| 2017/0021496 A1 | 1/2017 | Kanada et al. | |

FOREIGN PATENT DOCUMENTS

| | | |
|---|---|---|
| CN | 105904107 A | 8/2016 |
| WO | 2012062374 A1 | 5/2012 |
| WO | 2016154995 A1 | 10/2016 |

OTHER PUBLICATIONS

European Patent Office, Extended Search Report issued in corresponding Application No. 17898097.5, dated Oct. 15, 2020, 11 pp.

* cited by examiner

METHOD AND APPARATUS FOR SELECTING INITIAL POINT FOR INDUSTRIAL ROBOT COMMISSIONING

FIELD OF INVENTION

The present disclosure relates to the technical field of industrial robots, and more specifically, to a method and apparatus for selecting an initial point for industrial robot commissioning.

BACKGROUND OF INVENTION

WO2016/154995A1 discloses a method for industrial robot commissioning and an industrial robot system, wherein a touchscreen on a mobile device such as a mobile phone is used as an auxiliary tool in industrial robot commissioning, so as to achieve automatic and convenient industrial robot commissioning.

When using the above method, there is a need to determine an initial point near the touchscreen. Usually the initial point may be located near the center point of the touchscreen. In addition, when a stylus clicks on the touchscreen, the stylus had better be toughly perpendicular to the touchscreen.

Since the industrial robot does not know where the touchscreen is placed, the position of the initial point has to be specified manually or predefined by an offline cell model according to the prior art. This reduces automation of the entire process and increases extra workloads.

SUMMARY OF INVENTION

It is an objective of the present disclosure to provide a method and apparatus for selecting an initial point for industrial robot commissioning.

According to one aspect of the present disclosure, there is provided a method for selecting an initial point for industrial robot commissioning, the initial point being located above a touchscreen for industrial robot commissioning, the method comprising: calculating a nominal posture of a work object relative to the industrial robot; and selecting the initial point according to the nominal posture.

According to another aspect of the present disclosure, there is provided an apparatus for selecting an initial point for industrial robot commissioning, the initial point being located above a touchscreen for industrial robot commissioning, the apparatus comprising: a nominal posture calculating module for calculating a nominal posture of a work object relative to the industrial robot; and an initial point selecting module for selecting the initial point according to the nominal posture.

The method and apparatus for selecting an initial point for industrial robot commissioning as provided by the present disclosure can automatically select the initial point so as to further increase automation of the commissioning process and reduce workloads.

BRIEF DESCRIPTION OF THE DRAWINGS

The present invention may be better understood by description of embodiments of the present invention, with reference to the accompanying drawings, wherein, FIG. 1 schematically shows a flowchart of a method for selecting an initial point for industrial robot commissioning according to one embodiment of the present invention.

Throughout the figures, same or similar reference numbers indicate same or similar elements.

DETAILED DESCRIPTION OF EMBODIMENTS

Figure 1:
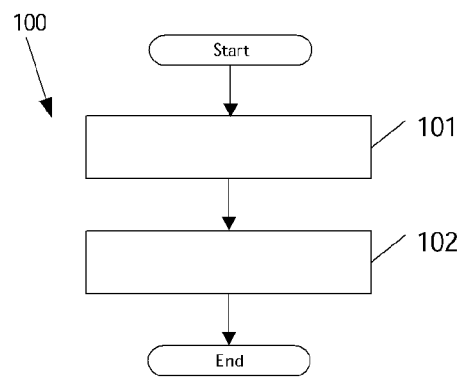

Description is presented below to specific embodiments of the present invention. It should be noted while describing the embodiments, this specification might not thoroughly describe all features of actual embodiments for the sake of brevity. It should be understood during actual implementation of any one embodiment, just as in the course of any one engineering project or design project, in order to achieve specific objectives of developers and satisfy system-related or business-related restrictions, usually a variety of concrete policies will be made, which also leads to changes from one embodiment to another embodiment. In addition, it may be understood though efforts made during such development might be complicated and tedious, to those of ordinary skills in the art related to content disclosed by the present invention, some variations to design, manufacture or production as made on the basis of technical content disclosed in the present disclosure are merely conventional technical means, and content of the present disclosure should not be construed as being insufficient.

Unless otherwise defined, technical or scientific terminology used in the claims and specification should be general meaning as interpreted by those of ordinary skills in the art. The words "first", "second" and the like are not to be read as any order, amount or importance but only are used to distinguish different components. The word "one" is not to be read as any amount restriction but is to be read as "at least one". The word "comprise" or "include" and the like means an element or article preceding "comprise" or "include" contains an element or article and equivalent elements as enumerated after "comprise" or "include", and does not exclude other element or article. The word "connect" or "link" and the like is neither limited to physical or mechanical connection nor limited to direct or indirect connection.

To make the objective, technical solution and advantages of the present invention clearer, the technical solution of the present invention will be clearly and completely described with reference to the specific embodiments and the accompanying drawings of the present invention. Obviously, the embodiments to be described are merely part of embodiments of the present invention, rather than all embodiments. Based on the embodiments of the present invention, all other embodiments as made by those of ordinary skills in the art without the exercise of any inventive skill should fall in the protection scope of the present invention.

While commissioning an industrial robot, a touchscreen may be used to assist in increasing automation and lightening the workload of manual operation. Specifically, a commissioning tool (e.g., stylus) connected at the robot's arm may be driven to click on some specific points on the touchscreen, and further coordinate values of these specific points under the robot's coordinate system as well as their coordinate values in a plane where the touchscreen is located are used as input data during commissioning, so as to complete multiple calibration tasks subsequently. Generally speaking, the touchscreen on a portable electronic device such as a mobile phone, a tablet computer and so on may be used.

Usually, positions of these specific points are defined using offset vectors between these points and the center point of the screen. However, the robot does not know the position of the center point of the screen. Therefore, there is a need to provide a method and apparatus for automatically selecting an initial point so as to cause the initial point to be close to the center point as far as possible.

The embodiments of the present invention first provide a method for selecting an initial point for industrial robot commissioning, which initial point may be located above a touchscreen for industrial robot commissioning.

FIG. 1 schematically shows a flowchart of a method 100 for selecting an initial point for industrial robot commissioning according to one embodiment of the present invention. As shown in FIG. 1, the method 100 may comprise steps 101 and 102.

In the step 101, a nominal posture of a work object relative to the industrial robot is calculated.

The so-called work object refers to an object which is manipulated and processed by the industrial robot during the process of actually using the industrial robot.

According to one embodiment of the present invention, when a mobile phone or a tablet computer which is common on the market is used as an auxiliary tool for industrial robot commissioning, the nominal posture may be obtained by an inertial sensor carried on the mobile phone or tablet computer.

The so-called inertial sensor may comprise an accelerometer, a gyroscope, a magnetometer, etc.

Figure 2:
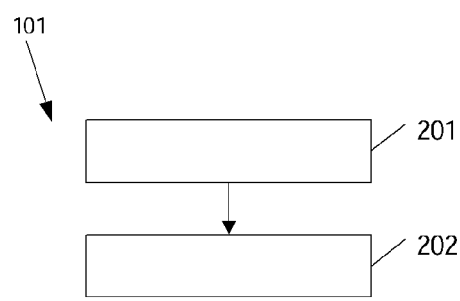
FIG. 2 schematically shows a flowchart of calculating a nominal posture during the process of selecting an initial point for industrial robot commissioning according to one embodiment of the present invention.

The nominal posture of the work object relative to the industrial robot may be an angle of rotation for the plane where the work object is located relative to the plane where a base frame of the industrial robot is located, in three axial directions under the space coordinate system. Therefore, as shown in FIG. 2, the step 101 may further comprise sub-steps 201 and 202 according to one embodiment of the present invention.

In the sub-step 201, a first output when the inertial sensor is at a first posture and a second output when the inertial sensor is at a second posture are obtained, wherein the first posture is same as a posture of the base frame of the industrial robot, and the second posture is same as a posture of the work object.

Figure 3:
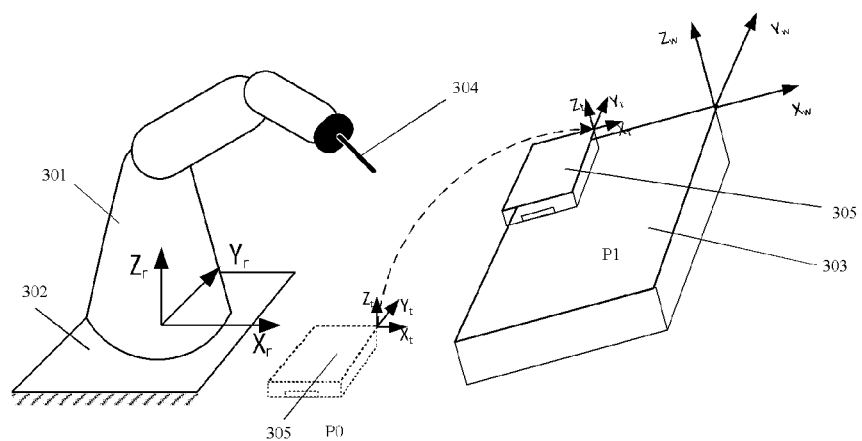
FIG. 3 schematically shows a schematic view of positions where an inertial sensor and a touchscreen are placed when calculating the nominal posture according to one embodiment of the present invention.

With reference to FIG. 3, a first posture P0 may be same as a posture of a base frame 302 of an industrial robot 301. That is to say, during actual operation, first a mobile phone or tablet computer 305 may be placed at a position that is roughly parallel to the plane where the base frame of the industrial robot is located, and further a first output when an inertial sensor on the mobile phone or tablet computer is located at the position may be obtained. According to one embodiment of the present invention, the first output may comprise angles of rotation for a touchscreen on the mobile phone or tablet computer 305 around the x axis, the y axis and the z axis respectively when the mobile phone or tablet computer is at the posture P0 shown in FIG. 3.

Then the mobile phone or tablet computer may be adjusted to a second posture P1 that is same as a posture of a work object 303, and further a second output when the inertial sensor on the mobile phone or tablet computer is at the second posture may be obtained. In particular, the mobile phone or tablet computer may be placed in the plane where the work object 303 is located, and further the second output of the inertial sensor on the mobile phone or tablet computer may be obtained. According to one embodiment of the present invention, the second posture may comprise angles of rotation for the touchscreen on the mobile phone or tablet computer 305 around the x axis, the y axis and the z axis respectively when the mobile phone or tablet computer is at the posture P1 shown in FIG. 3.

In the sub-step 202, a nominal posture of the work object relative to the industrial object is calculated according to the first output and the second output.

The nominal posture of the work object relative to the industrial object may be obtained according to a deviation between the first output and the second output.

The precision of the nominal posture obtained as such might not be quite high, but is enough to complete robot commissioning.

In the step 102, the initial point is selected according to the nominal posture.

After the nominal posture is obtained, a stylus 304 for commissioning on the robot may be moved to a position that is roughly perpendicular to the plane where the touchscreen is located.

Figure 4:
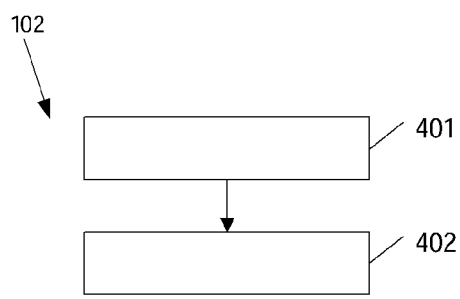
FIG. 4 schematically shows a flowchart of selecting the initial point according to the nominal posture during the process of selecting the initial point for industrial robot commissioning according to one embodiment of the present invention.

As shown in FIG. 4, according to one embodiment of the present invention, the step 102 may further comprise sub-steps 401 to 402 as below.

In the sub-step 401, a preset position of a pre-touch point is obtained which is any point on the touchscreen. At the pre-touch point, the stylus for industrial robot commissioning touches the touchscreen.

According to one embodiment of the present invention, the pre-touch point may be any point on the touchscreen.

Figure 5:
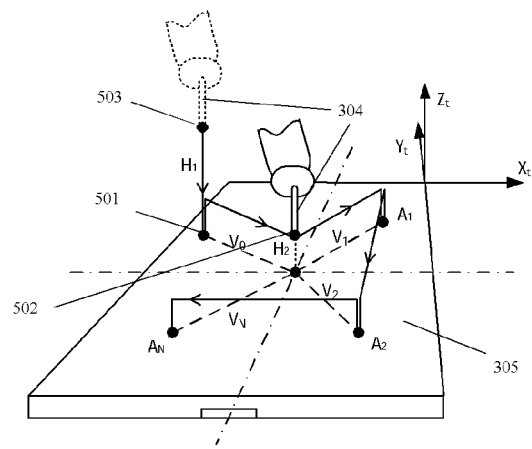
FIG. 5 schematically shows a schematic view of a movement path for a stylus when selecting the initial point according to the nominal posture according to one embodiment of the present invention.

According to one embodiment of the present invention, with reference to FIG. 5, first the stylus may be moved to any position 503 at a height of H1 above the touchscreen 305, then the stylus may be moved along a direction roughly perpendicular to the touchscreen so as to touch the touchscreen, and further a coordinate value of a point 501, where the stylus touches the touchscreen, under a touchscreen coordinate system $(X_t, Y_t, Z_t)$ is used as the pre-touch point position.

In the sub-step 402, the initial point is selected according to the nominal posture, the pre-touch point, a center point of the touch screen and a preset height.

According to one embodiment of the present invention, an offset vector of the pre-touch point position relative to the center point of the touchscreen may be calculated first.

According to one embodiment of the present invention, since a coordinate value of the center point of the touchscreen under the touchscreen coordinate system can be learned, an offset vector V0 between the pre-touch point and the screen's center point under the touchscreen coordinate system may be calculated. Then, an offset vector between the pre-touch point and the screen's center point under a robot coordinate system $(X_r, Y_r, Z_r)$ may be figured out using the nominal posture as obtained in the step 101.

According to one embodiment of the present invention, the initial point may be selected according to the offset vector and a preset height.

According to one embodiment of the present invention, the stylus may be moved to a position at a height of H2 above the touchscreen's center point according to the offset vector of the pre-touch point position relative to the center point of the touchscreen and a preset height H2, which is the position of an initial point 502. The height H2 may be selected to be less than the height H1, so as to increase the subsequent commissioning speed.

After the initial point is selected, coordinate values of commissioning points $A_1$ to $A_N$ under the robot coordinate system may be obtained according to predefined offset vectors $V_1$ to $V_N$ between the commissioning points $A_1$ to $A_N$ and the center point, and further the robot is controlled to use the stylus to click on these commissioning points on the touchscreen, so as to complete the subsequent commissioning work.

Figure 6:
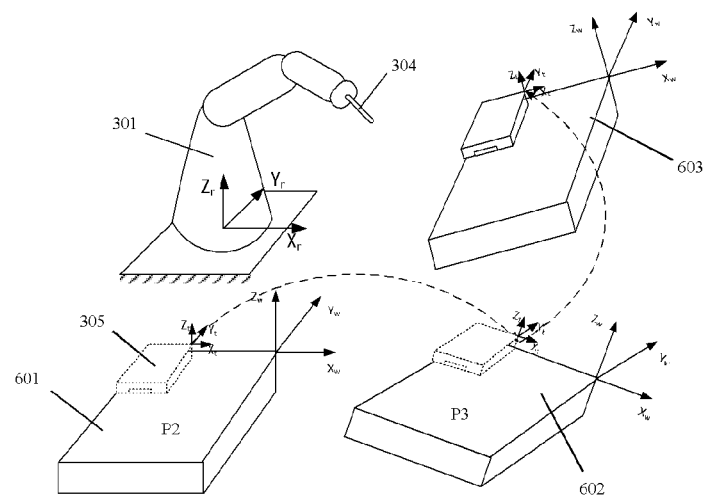
FIG. 6 schematically shows a schematic view of selecting a pre-touch point during the process of selecting an initial point for industrial robot commissioning when there are a plurality of work objects according to one embodiment of the present invention.

As shown in FIG. 6, when there are a plurality of work objects, the position of a pre-touch point corresponding to one of any two work objects may be calculated according to a posture deviation between the any two work objects and the position of a pre-touch point corresponding to the other of the any two work objects.

For example, in FIG. 6, after the initial point for the touchscreen that is at the posture P2 is selected through the above steps 101 and 102, a posture deviation between the touchscreen at a posture P3 and the touchscreen at the posture P2 may be obtained by the inertial sensor, and further coordinates of a pre-touch point when the touchscreen is located at the position of a work object 602 may be obtained.

That is to say, in actual operation, the mobile phone or tablet computer 305 may be placed, in order, in planes where work objects 601, 602 and 603 are located; after the initial point when the touchscreen is located at the position of the work object 601 is obtained, coordinates of a pre-touch point when the touchscreen is located at the position of the work object 602 may be calculated according to coordinates of the initial point and a deviation between the posture P2 and the posture P3, and so on, coordinates of a pre-touch point when the touchscreen is located at the position of the work object 603 may also be calculated.

Description has been presented above to the method for selecting an initial point for industrial robot commissioning according to the embodiments of the present invention. The method of the present invention can automatically select the initial point so as to further increase automation of the commissioning process and reduce workloads.

Figure 7:
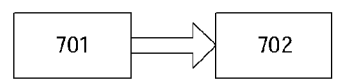
FIG. 7 schematically shows a schematic view of an apparatus for selecting an initial point for industrial robot commissioning according to one embodiment of the present invention.

The present invention further provides an apparatus for selecting an initial point for industrial robot commissioning, which initial point may be located above a touchscreen for industrial robot commissioning. With reference to FIG. 7, this figure illustrates a schematic view of an apparatus 700 for selecting an initial point for industrial robot commissioning according to one embodiment of the present invention. As shown in FIG. 7, the apparatus 700 may comprise: a nominal posture calculating module 701 for calculating a nominal posture of a work object relative to the industrial robot; and an initial point selecting module for selecting the initial point according to the nominal posture.

According to one embodiment of the present invention, the nominal posture calculating module 701 may further comprise: an inertial sensor output obtaining module for obtaining a first output when an inertial sensor is at a first posture and a second output when the inertial sensor is at a second posture, wherein the first posture is same as a posture of a base frame of the industrial robot, and the second posture is same as a posture of the work object; and a nominal posture calculating sub-module for calculating a nominal posture of the work object relative to the industrial robot according to the first output and the second output.

According to one embodiment of the present invention, the initial point selecting module 702 may further comprise: a pre-touch point position obtaining module for obtaining a preset position of a pre-touch point, the pre-touch point being any point on the touchscreen, at the pre-touch point a stylus for industrial robot commissioning touching the touchscreen; an offset vector calculating module for calculating an offset vector of the position of the pre-touch point relative to a position of a center point of the touchscreen according to the nominal posture; and an initial point selecting sub-module for selecting the initial point according to the offset vector and a preset height.

According to one embodiment of the present invention, the pre-touch point position obtaining module may further comprise: a module obtaining positions of multiple pre-touch points, for calculating, when there are multiple work objects, a position of a pre-touch point corresponding to one of any two work objects according to a posture deviation between the any two work objects and a position of a pre-touch point corresponding to the other of the any two work objects.

According to one embodiment of the present invention, the first output comprises an angle of rotation for the touchscreen around the x axis, an angle of rotation for the touchscreen around the y axis as well as an angle of rotation for the touchscreen around the z axis, and the second output comprises an angle of rotation for the touchscreen around the x axis, an angle of rotation for the touchscreen around the y axis as well as an angle of rotation for the touchscreen around the z axis.

According to one embodiment of the present invention, the inertial sensor is integrated with the touchscreen.

Description has been presented above to the apparatus method for selecting an initial point for industrial robot commissioning according to the embodiments of the present invention. The apparatus of the present invention can automatically select the initial point so as to further increase automation of the commissioning process and reduce workloads.

The embodiments of the present invention have been illustrated above, but are not intended to limit the present invention. Various variations and changes to the present invention will be apparent to those skilled in the art. Any modification, equivalent replacement, improvement and so on as made under the spirit and principle of the present invention should be included in the scope of the claims of the present invention.

The invention claimed is:

1. A method for selecting an initial point for industrial robot commissioning, the initial point being located above a touchscreen for industrial robot commissioning, the method comprises:

calculating a nominal posture of a work object relative to the industrial robot; and selecting the initial point according to the nominal posture; wherein the step of calculating a nominal posture further comprises: obtaining a first output when an inertial sensor is at a first posture and a second output when the inertial sensor is at a second posture, wherein the first posture is same as a posture of a base frame of the industrial robot, and the second posture is same as a posture of the work object; and calculating a nominal posture of the work object relative to the industrial robot according to the first output and the second output.

2. The method according to claim 1, wherein the step of selecting the initial point according to the nominal posture further comprises:
  obtaining a preset position of a pre-touch point, the pre-touch point being any point on the touchscreen, at the pre-touch point a stylus for industrial robot commissioning touching the touchscreen; and
  selecting the initial point according to the nominal posture, the pre-touch point, a center point of the touch screen and a preset height.

3. The method according to claim 2, wherein the step of obtaining a position of a pre-touch further comprises:
  when there are multiple work objects, calculating a position of a pre-touch point corresponding to one of any two work objects according to a posture deviation between the any two work objects and a position of a pre-touch point corresponding to the other of the any two work objects.

4. The method according to claim 2, wherein the first output comprises an angle of rotation for the touchscreen around the x axis, an angle of rotation for the touchscreen around the y axis as well as an angle of rotation for the touchscreen around the z axis, and the second output comprises an angle of rotation for the touchscreen around the x axis, an angle of rotation for the touchscreen around the y axis as well as an angle of rotation for the touchscreen around the z axis.

5. The method according to claim 2, wherein the inertial sensor is integrated with the touchscreen.

6. An apparatus for selecting an initial point for industrial robot commissioning, the initial point being located above a touchscreen for industrial robot commissioning, the apparatus configured to:
  calculate a nominal posture of a work object relative to the industrial robot; and
  select the initial point according to the nominal posture;

wherein the calculate the nominal posture of the work object relative to the industrial robot is further configured to:
  obtain a first output when an inertial sensor is at a first posture and a second output when the inertial sensor is at a second posture, wherein the first posture is same as a posture of a base frame of the industrial robot, and the second posture is same as a posture of the work object; and
  calculate a nominal posture of the work object relative to the industrial robot according to the first output and the second output.

7. The apparatus according to claim 6, wherein the select the initial point further includes the following:
  obtain a preset position of a pre-touch point, the pre-touch point being any point on the touchscreen, at the pre-touch point a stylus for industrial robot commissioning touching the touchscreen; and
  select the initial point according to the nominal posture, the pre-touch point, a center point of the touch screen and a preset height.

8. The apparatus according to claim 7, wherein the obtain the pre-touch point position further includes the following:
  obtain positions of multiple pre-touch points, for calculating, when there are multiple work objects, a position of a pre-touch point corresponding to one of any two work objects according to a posture deviation between the any two work objects and a position of a pre-touch point corresponding to the other of the any two work objects.

9. The apparatus according to claim 6, wherein the first output comprises an angle of rotation for the touchscreen around the x axis, an angle of rotation for the touchscreen around the y axis as well as an angle of rotation for the touchscreen around the z axis, and the second output comprises an angle of rotation for the touchscreen around the x axis, an angle of rotation for the touchscreen around the y axis as well as angle of rotation for the touchscreen around the z axis.

10. The apparatus according to claim 6, wherein the inertial sensor is integrated with the touchscreen.

* * * * *